Aug. 11, 1970  L. A. UNTI ET AL  3,523,702
FASTENER AND TELESCOPING LEG
Filed June 5, 1968
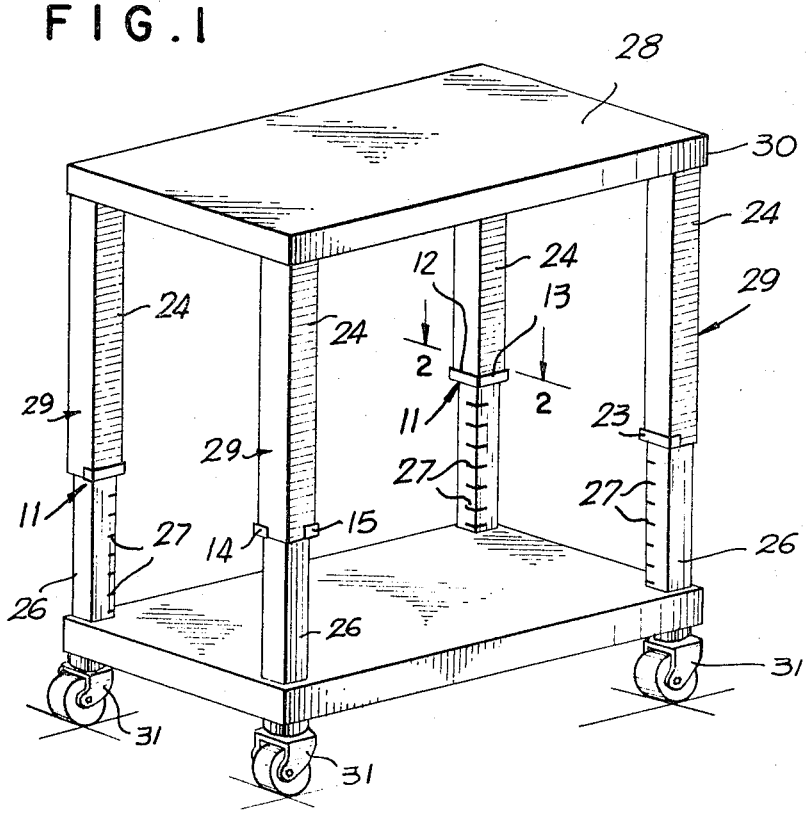
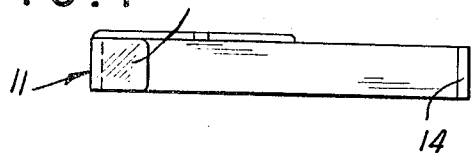
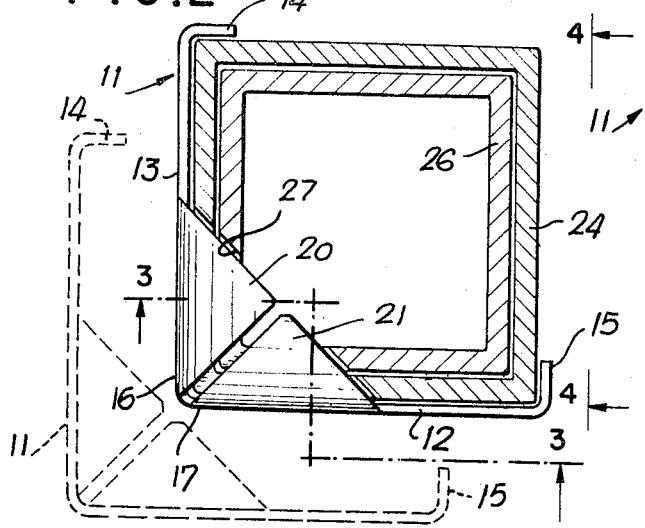
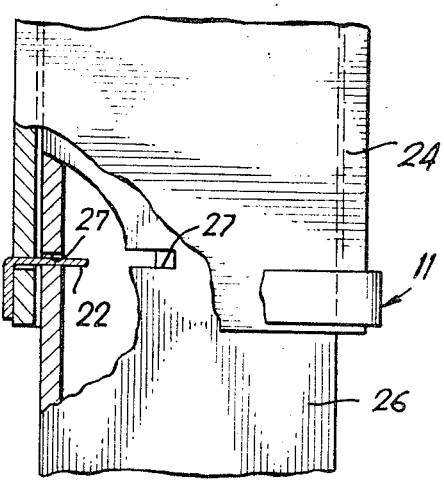
INVENTORS
LOUIS A. UNTI
ERNST JOSEPH UTZ
BY *J. Walter Bader*
ATTORNEY United States Patent Office 3,523,702
Patented Aug. 11, 1970

3,523,702
FASTENER AND TELESCOPING LEG
Louis A. Unti, Chicago, Ill., and Ernst Joseph Utz, West Chicago, Ill., assignors to Wilson Jones Company, Niles, Ill., a corporation of Delaware
Filed June 5, 1968, Ser. No. 734,756
Int. Cl. A47b 9/14; F16m 11/32
U.S. Cl. 287—58                                                8 Claims

ABSTRACT OF THE DISCLOSURE

A fastener made of springable material and normally axially biased in combination with an adjustable leg. The fastener has a pair of arms joined together in end-to-end relationship and right angularly disposed with respect to one another. A triangular holding portion is carried by each of the arms at their joined end portions. The holding portions are spaced from one another. The opposite end portions of the arms are spaced from one another and each carry a right-angularly disposed offset portion. The fastener is used to secure the adjustable leg in position. The adjustable leg includes an inner rectangular member provided with a plurality of spaced slots and an outer member provided with a mating single slot. The members are telescopcially connected with one another. The arms are disposed upon the outer member with the holding portions lying within mating slots to retain the telescoping members in fixed position.

DESCRIPTION OF THE INVENTION

This invention relates to a fastener which is preferably utilized as a support to retain a telescoping leg in various adjusted positions. The fastener of this invention may be installed and removed from position without the use of any tools. The fastener is particularly advantageous in the assembly of office-type furniture such as a table, a stand, and the like. It is well known that offices, in general, do not have any tools. The clerical force normally available to assemble office furniture can therefore not effectively do the job even if only a screwdriver is required. As a result furniture is delivered to an office and stands in the office until the building maintenance man, the janitor, or the like, is summoned. This is a wasteful and time-consuming procedure.

By the use of the invention described herein office furniture can be assembled quickly and easily and without any tools whatsoever.

The above sets forth a brief description of this invention and some of the objects and advantages thereof. Other objects and advantages of this invention will become apparent as the description proceeds.

The invention will now be further described by reference to the accompanying drawings which are made a part of this specification.

FIG. 1 is an isometric perspective view of an office table having the telescoping leg and the fastener of this invention included therein.

FIG. 2 is a cross-sectional view taken along lines 2—2 of FIG. 1 with the fastener in disassembled position indicated in phantom lines.

FIG. 3 is a fragmentary cross-sectional view with a portion of the structure broken away taken along lines 3—3 of FIG. 2.

FIG. 4 is a cross-sectional view taken along lines 4—4 of FIG. 2.

The invention will now be further described by reference to the specific form thereof shown in the accompanying drawings. In this connection, however, the reader is cautioned to note that the specific form of this invention as set forth in the specification herein is for illustrative purposes and for purposes of example only. Various changes and modifications could obviously be made within the spirit and scope of this invention.

A table 28 is shown in FIG. 1 having a plurality of legs 29 secured to a top 30. A plurality of casters 31 are disposed beneath each of the legs.

Each of the legs is formed with an outer telescoping member 24 and an inner telescoping member 26. Inner telescoping member 26 of each of legs 29 are provided wtih a plurality of spaced slots 27. Telescoping members 26 and 24 are slidably movable within one another.

A fastener 11 is utilized to secure portions 24 and 26 in various relationships with one another. The fastener 11 is provided with a pair of diverging arms 12 and 13 which include offset end portions 14 and 15. The opposite end portions 16 and 17 of arms 12 and 13 are joined to one another in end-to-end relationship. Arms 12 and 13 are preferably disposed at right angles to one another.

A plurality of triangular inwardly and laterally disposed portions 20 and 21 are provided upon arms 12 and 13 respectively. Portions 20 and 21 are designed to removably fit within a corresponding recess 27.

Arms 12 and 13 are also provided with a base portion 22 and an upwardly extending portion 23.

With the foregoing description the operation of this invention can now be explained.

Portions 24 and 26 of a leg 29 are slid into the proper positions desired with a slot 27 in aligned position. Arms 12 and 13 of a fastener 11 are diverged by engaging arm end portion 14 on the corner of the upper leg 24 and the fastener can be snapped into the locking position, and portions 20 and 21 snapped into recess 27. The arms are then released and the fastener snaps into position.

The foregoing sets forth the manner in which the objects of this invention are achieved.

We claim:

1. A fastener adapted to join a pair of members to one another, said fastener comprising a pair of right angularly disposed arms joined together in end to end relationship, means for retaining the fastener to the members being secured, and a laterally projecting and inwardly disposed triangular projecting planar holding portion carried by each of said arms at their joined end portions, the plane of said holding portions lying perpendicular to the plane of said arms.

2. A fastener as described in claim 1 said holding portions being spaced from one another.

3. A fastener as described in claim 2 the opposite end portions of each of said arms carrying a portion offset from the other portion.

4. A fastener as described in claim 3 the offset portions being right angularly disposed with respect to said arms.

5. A fastener as described in claim 4 the unjoined end portions of said arms being spaced from one another.

6. An adjustable telescoping leg for a furniture article comprising a substantially rectangular inner member provided with a plurality of spaced slots and a substantially rectangular outer member having means providing access to said slots, said members being telescopically connected with one another, a fastener having a pair of right angularly disposed arms joined to one another in end-to-end relationship with the opposite end portions of said arms spaced from one another, said arms having a base portion lying upon said outer member and an inwardly and laterally projecting triangular holding portion carried by each of said arms at their joined end portions and spaced from one another, said holding portions being disposed within one of said slots within said inner member.

7. An adjustable leg as described in claim 6 including an additional right angularly disposed offset portion at the opposite end portions of each of said arms.

8. An adjustable leg as described in claim 7 said members being of springable material and being normally axially biased.

References Cited

UNITED STATES PATENTS

| 2,403,881 | 7/1946 | Tarbox | 287—189.35 X |
| 2,554,957 | 5/1951 | Riblet | 85—8.8 X |
| 2,850,307 | 9/1958 | Kindl. | |
| 3,302,962 | 2/1967 | Heywood. | |

FOREIGN PATENTS 257,406   9/1926   Great Britain.

RAMON S. BRITTS, Primary Examiner

U.S. Cl. X.R.

108—106, 144; 248—188.5, 423